United States Patent

[11] 3,566,023

[72] Inventor Edward S. Smierciak
Fort Wayne, Ind.
[21] Appl. No. 658,099
[22] Filed Aug. 3, 1967
[45] Patented Feb. 23, 1971
[73] Assignee International Telephone and Telegraph Corporation

[54] SEQUENTIAL DOT, DIGITALLY ENCODED TELEVISION SYSTEM
8 Claims, 10 Drawing Figs.

[52] U.S. Cl. .......... 178/7.1, 178/6.8, 179/15
[51] Int. Cl. .......... H04m 5/38
[50] Field of Search .......... 178/6 (BWR), 6.8, 7.7; 328/63, 161; 179/15.55 (BWR), 340—347 (A.D.); 325/38

[56] References Cited
UNITED STATES PATENTS

| | | | |
|---|---|---|---|
| 2,922,151 | 1/1960 | Reiling .......... | 340/347 |
| 2,982,953 | 5/1961 | Cadden et al. .......... | 328/37 |
| 3,136,847 | 6/1964 | Brown .......... | 178/6.8 |
| 3,354,267 | 11/1967 | Crater .......... | 325/38 |
| 3,378,641 | 4/1968 | Varsos et al. .......... | 325/38 |
| 3,422,227 | 1/1969 | Brown .......... | 325/38 |

OTHER REFERENCES
Arithmetic Operations in Digital Computers pp 144— 149

*Primary Examiner*—Robert L. Griffin
*Assistant Examiner*—Donald E. Stout
*Attorney*—C. Cornell Remsen, Jr., Rayson P. Morris, Percy P. Lantzy, Philip M. Bolton and Hood, Gust, and Irish

ABSTRACT: A sequential dot, digitally encoded, raster-type television system including an input circuit for receiving a time-based video signal having recurrent line and frame synchronizing signals; a clock pulse generator is provided for generating a train of clock pulses having a frequency $$f_c = f_e n_2$$

where $f_e$ is the sampling signal frequency $$f_e = f_v \frac{(LD)}{n_1 n_2}$$

where $f_v$ is the frequency of the frame synchronizing signals, $L$ is the number of lines in one frame, $D$ is the number of picture elements in one line, $n_1$ is the vertical interlace ratio (if any), and $n_2$ is a predetermined dot interlace ratio, it being required that the quotient $\frac{LD}{n_1 n_2}$ be irreducible. Means are provided for generating a train of recurrent sampling signals having the frequency $f_e$, the sampling signal generating means being coupled to the clock pulse generator and actuated thereby. Means are provided for coupling the input circuit to an output circuit in response to the train of sampling signals thereby to pass a train of sampled analogue video signals, i.e., sequential dot interlaced video signals from the input circuit to the output circuit. An amplitude level comparator is provided which quantizes the sampled analogue video signals on a predetermined number of levels, and a decimal to binary converter is coupled to the amplitude level comparator for converting the amplitude-responsive signals to parallel binary coded form. A parallel-to-serial converter couples the decimal-to-binary converter to a transmission facility for converting the parallel binary coded signals to serial binary coded form.

At the receiving station, a serial-to-parallel converter is coupled to the transmission facility for converting the transmitted serially-coded binary signals to parallel binary form and a digital-to-analogue converter is coupled to the serial-to-parallel converter for converting the parallel binary coded signals to analogue form, thus reconstructing the original sampled analogue video signals, i.e., the sequential dot interlaced signals which may be applied to a conventional video monitor.

INVENTOR
EDWARD S. SMIERCIAK
BY Hood, Gust & Irish
ATTORNEYS

INVENTOR
EDWARD S. SMIERCIAK
BY Wood, Herst + Irish
ATTORNEYS

INVENTOR
EDWARD S. SMIERCIAK
BY Wood, Herst + Irish
ATTORNEYS

INVENTER
EDWARD S. SMIERCIAK
BY Hood, Gust & Irish
ATTORNEYS

INVENTOR
EDWARD S. SMIERCIAK
BY Wood, Gust & Irish
ATTORNEYS

SEQUENTIAL DOT, DIGITALLY ENCODED TELEVISION SYSTEM

BACKGROUND OF THE INVENTION

1. Field of the Invention

This invention relates generally to sequential dot interlaced television systems, and more particularly to a sequential dot, digitally encoded television system.

2. Description of the Prior Art

In conventional broadcast television, 30 complete frames are transmitted each second, each frame comprising 525 lines. With each line containing on the order of 400 picture elements, each of which can have many levels of brightness, i.e., black, grays and white, the transmission of conventional broadcast television picture signals requires a transmission facility having a band width of approximately 4 megacycles. However, from an information standpoint, this television picture contains much more information than the human eye can possibly assimilate. Thus, due to the limitations of the human eye, television pictures can be presented containing less information without severe picture quality degradation.

It has been proposed, such as in U.S. Pat. No. 2,479,880 to P.M.G. Toulon, and U.S. Pat. No. 3,136,847 to E.F. Brown, to reduce the band width required for television signal transmission by taking advantage of the psychophysical characteristics of the human eye. In accordance with such a proposal, a normal line-television presentation is divided into a series of dots or elements. These dots being transmitted in a predetermined sequence, such as every second, fourth, eighth, 16th, etc., dot. By thus transmitting these dots or elements in a sequential manner, a resulting image is generated containing sufficient information for the eye by reason of its psychophysical characteristics, to receive the entire picture.

The principle of operation of sequential dot interlacing is essentially the same as that employed in normal television for vertical interlacing of the horizontal scanning lines, the only difference being that the interlacing now takes place in a horizontal axis rather than the vertical axis. The requirements for horizontal dot interlacing are expressed by the following equation:

$$f_e = f_v \left( \frac{LD}{n_1 n_2} \right)$$

The above equation defines the frequency $f_e$ of the dots or elements to be transmitted out of each line required for a dot interlace ratio of $n_2$. With the employment of such a sequential dot interlaced system, the band width required for transmission can be reduced by a factor equal to the sequential dot interlace ratio, i.e., by the factor of $n_2$. Thus, with a sequential dot interlace ratio of four, the bandwidth of the transmission facility may be reduced by the factor of four.

In addition to the foregoing, the transmission over long distances of conventional analogue television signals involves signal-to-noise ratio problems with resulting deterioration of the received signals and thus the displayed picture. Transmission of information in digitally coded form, i.e., binary form in which each signal is either a "one" or a "zero" is much more efficient than transmission of information in analogue form by reason of improvement in the signal-to-noise ratio.

Conversion of conventional analogue television signals to digital form, employing the requisite number of brightness levels, would necessitate a transmission facility having a bandwidth substantially greater than that required for transmission of the analogue signals; digital encoding of 64 brightness levels would require a transmission facility having a bandwidth six times greater than that normally required. However, the sampled analogue video signals resulting from the sequential dot interlace process may be converted to digital form and transmitted over a transmission facility having the same bandwidth as that employed for transmission of conventional broadcast-type analogue television signals. Thus, by the employment of a sequential dot interlace ratio the same as the number of binary bits in the digital code, the resulting digital signals may be transmitted over a transmission facility having the same bandwidth as that required for the original analogue-type television signals; the sampled analogue video signals provided by the sequential dot interlace system having a dot interlace ratio of six may be quantized on 64 levels, converted to a six-bit binary code, and then transmitted over a transmission facility having the same bandwidth as that required for transmitting the original analogue video signals prior to application of the sequential dot interlace process.

SUMMARY OF THE INVENTION

A sequential dot, digitally encoded, raster-type television transmission system including input circuit means for receiving a time-based video signal having recurrent line and frame synchronizing signals. Means are provided for generating a train of recurrent sampling signals having a frequency $$f_e = f_v \left( \frac{LD}{n_1 n_2} \right)$$

where $f_v$ is the frequency of the frame synchronizing signals, $L$ is the number of lines in one frame, $D$ is the predetermined number of picture elements in one line, $n_1$ is the vertical interlace ratio, $n_2$ is a predetermined dot interlace ratio, the quotient $LD/n_1n_2$ being irreducible. Means are provided for coupling the input circuit means to output circuit means in response to the train of sampling signals thereby to pass a train of sampled analogue video signals from the input circuit means to the output circuit means. Means are provided for detecting the amplitudes of the sampled video signals and for providing signals respectively responsive to a plurality of predetermined amplitude levels thereof, and means are provided for digitally encoding the amplitude-responsive signals. It is accordingly an object of the invention to provide a sequential dot, digitally encoded television system.

The above-mentioned and other features and objects of this invention and the manner of attaining them will become more apparent and the invention itself will be best understood by reference to the following description of an embodiment of the invention taken in conjunction with the accompanying drawings, wherein:

DESCRIPTION OF THE PREFERRED EMBODIMENTS

Figure 1:
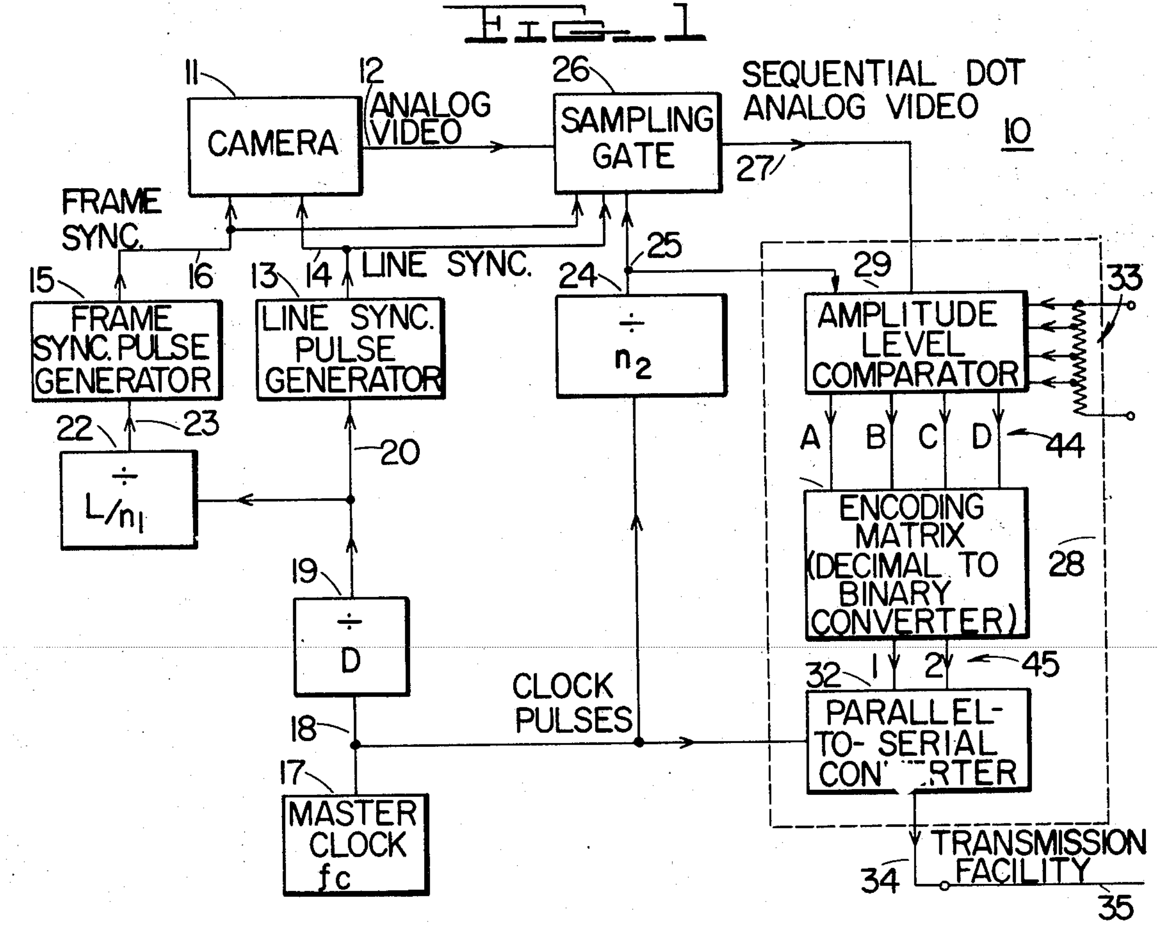
FIG. 1 is a schematic block diagram showing a transmitting station incorporating one embodiment of the sequential dot, digitally encoded television system of the invention.

Referring now to FIG. 1, there is shown a transmitting station, generally indicated at 10, incorporating one embodiment of the sequential dot, digitally encoded, raster-type television system of the invention. A conventional television camera 11 is provided having conventional horizontal and vertical (line and frame) sweep circuitry and a video signal output circuit 12 in which a time-based analogue video signal is provided in response to scanning of an optical image by the camera 11, as is well known to those skilled in the art.

A conventional line synchronizing pulse generator 13 is provided having its output circuit 14 coupled to the horizontal sweep circuitry of the camera 11, and a conventional frame synchronizing pulse generator 15 is provided having its output circuit 16 likewise coupled to the vertical sweep circuitry of the camera 11.

A master clock pulse generator 17 is provided which actuates the sequential dot interlacing and analogue-to-digital conversion circuitry of the invention, and also in the illustrated embodiment is employed for actuating the line and frame synchronizing pulse generators 13 and 15.

The general equation governing vertical line interlacing in a raster-type television display is:

$$f_h = f_v \frac{L}{n_1}$$

where $f_h$ is the horizontal sweep frequency, $f_v$ is the vertical sweep frequency, $L$ is the number of lines in a complete frame and $n_l$ is the vertical interlace ratio, it being required for vertical interlacing to take place that the quotient $L/n_1$. be irreducible, i.e., that there be no common factors of the integers $L$ and $n_1$.

The requirement for horizontal dot interlacing is expressed by the equation:

$$f_e = f_h \frac{D}{n_2}$$

where $f_e$ is the frequency of the elements or dots sampled line by line, $D$ is the number of picture elements or dots in a horizontal line and $n_2$ is the dot interlace ratio, it again being required that the quotient $D/n_2$ be irreducible. The frequency of the dots or elements without sampling, i.e., the frequency of the master clock 17 is:

$$f_c = f_e n_2$$

and it will thus be seen that the horizontal sweep frequency $$f_h = \frac{f_c}{D}$$

. Thus, in the illustrated embodiment, the output circuit 18 of the master clock 17 is coupled to a conventional dividing circuit 19 which divides the frequency $fc$ of the clock pulses generated by the master clock 17 by $b$, i.e., the total number of dots or elements in a single line. Dividing circuit 19 has its output circuit 20 coupled to the line synchronizing pulse generator 13 for actuating the same. Output circuit 20 of the dividing circuit 19 is likewise coupled to a conventional dividing circuit 22 which divides the horizontal sweep frequency $f_h$ by $L/n_l$ to provide the vertical sweep frequency $f_v$ in its output circuit 23 which is coupled to the frame synchronizing pulse generator 15 for actuating the same.

In a specific embodiment of this system shown in FIG. 1 in which there is no vertical interlacing, i.e, $n_1$ equals 1, and the vertical sweep frequency $f_v$ is 60 cycles per second, there being 161 lines per frame ($L$), 161 elements or dots per line ($D$), and a dot interlace ratio $n_2$ of 4, the master clock pulse generator 17 will provide a train of clock or timing pulses having a frequency $f_c$ of 1,555,260 cycles per second, dividing circuit 19 will divide the clock pulses by 161 to provide a horizontal sweep frequency $f_h$ of 9,660 cycles per second, and dividing circuit 22 will provide the horizontal sweep frequency $f_h$ by 161 to provide the vertical sweep frequency $f_e$ of 60 cycles per second.

Output circuit 18 of the master clock pulse generator 17 is also coupled to another conventional dividing circuit 24 which divides the clock pulse frequency $f_c$ by $n_2$, i.e., the dot interlace ratio to provide the sampling frequency $f_e$ in its output circuit 25. Thus, in the above-described illustrated embodiment in which the dot interlace ratio $n_2$ is 4, dividing circuit 24 divides the master clock pulse frequency of 1,555,260 cycles per second by 4 to provide a train of sampling pulses in output circuit 25 having a frequency $f_e$ of 388,815 cycles per second.

Output circuit 12 of the camera 11 is coupled to a conventional sampling gate 26. Output circuit 25 of the dividing circuit 24 together with the output circuit 14 and 16 of the line and frame synchronizing pulse generators 13, 15 are coupled to the gating signal input circuits of the sampling gate 26. Sampling gate 26 is of the type which is normally gated off, but which is gated ON thereby to pass a video signal from output circuit 12 of camera 11 to its output circuit 27 in response to a sampling pulse in output circuit 25 of the divider 12, or to a line or frame synchronizing pulse in output circuits 14, 16 of the line and frame synchronizing pulse generators 13, 15. Thus, there will be provided in the output circuit 27 of the sampling gate 26 a train of sampled, analogue video signal pulses having the frequency $f_e$ with superimposed line and frame synchronizing pulses.

In order to convert the sampled, analogue video signal pulses in the output circuit 27 of the sampling gate 26, i.e., the sequential dot interlaced video signal pulses, to digital form, an analogue-to-digital converting circuit is provided, shown within the dashed lines 28 in FIG. 1. In the illustrated embodiment, the analogue-to-digital converting circuit 28 comprises a conventional amplitude level comparator 29, a conventional decimal-to-binary converter 30 and a conventional parallel-to-serial converter 32. The amplitude level comparator 29 has its input circuit coupled to the output circuit 27 of the sampling gate 26. Output circuit 25 of the dividing circuit 24 is also connected to the amplitude level converter 29 to synchronize the level detecting action with the sampled video pulses in output circuit 27 of the sampling gate 26. For the sake of simplicity, the amplitude level comparator 29 is shown as quantizing the sampled, analogue video signal pulses in the output circuit 27 of the sampling gate 26 on only four levels, it being readily understood that the sampled, analogue video signal pulses will typically be quantized on a greater number of levels. Thus, the amplitude level comparator 29 is shown as being coupled to a reference voltage source 33 providing four predetermined reference voltage levels, and has having four output circuits designated A, B, C and D in which the amplitude-responsive signals resulting from comparison of the sampled, analogue video pulses with the reference voltages respectively appear.

The output circuits of the amplitude level comparator 29 are coupled to the decimal-to-binary converter 30 which converts the amplitude responsive signals to parallel binary coded form. In the illustrated embodiment in which the sampled, analogue video signal pulses are quantized on four levels, the decimal-to-binary converter 30 converts the four amplitude-responsive signals to 2-bit binary coded form, as is well known to those skilled in the art. It will be readily understood that in the case of quantizing the sequential dot analogue video signals on a greater number of levels, a corresponding greater number of binary bits will be required. Thus, if the sequential dot analogue video signal pulses are quantized on 16 levels, conversion to a 4-bit binary code is required, whereas if the sequential dot analogue video signal pulses are quantized on 64 levels, a 6-bit binary conversion is required.

Thus, in the illustrated embodiment in which a 2-bit decimal-to-binary conversion is provided, the two output circuits of the decimal-to-binary converter 30 are coupled to a conventional parallel-to-serial converter 32. Output circuit 18 of the master clock pulse generator 17 is coupled to the parallel-to-serial converter 32 to actuate the parallel-to-serial conversion, and its output circuit 34, in which the serial binary coded information appears, is coupled to a conventional transmission facility 35.

Figure 2:
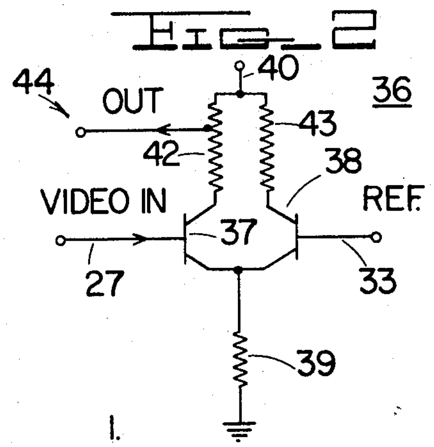
FIG. 2 is a schematic diagram showing one stage of an amplitude level comparator usable in the system of FIG. 1.

Referring now to FIG. 2, the amplitude level comparator 29 may comprise a plurality (four in the illustrated embodiment)

of conventional differential amplifier circuits 36, each comprising a pair of NPN transistors 37, 38 respectively having their emitters connected together and to a common reference voltage source, such as ground, by a resistor 39. Output circuit 27 of the sampling gate 26 is coupled to the base of the transistor 37 of each of the differential amplifiers 36 while the base of the other transistor 38 is coupled to the respective reference voltage source 33. The collectors of the transistors 37, 38 are respectively coupled to a suitable source of potential 40 by resistors 42, 43, the respective output circuit 44 being made by a tapped connection to resistor 42. It will be readily understood that whenever the amplitude of a video signal pulse in circuit 27 exceeds the amplitude level of the reference voltage 33, an output voltage pulse will be provided in the output circuit 44 having an amplitude determined by the location of the tapped connection.

It will be readily understood that there are many other forms of amplitude level comparators which may be employed for the amplitude level comparator 29, the single stage shown in FIG. 2 being merely by way of illustration.

Figure 3:
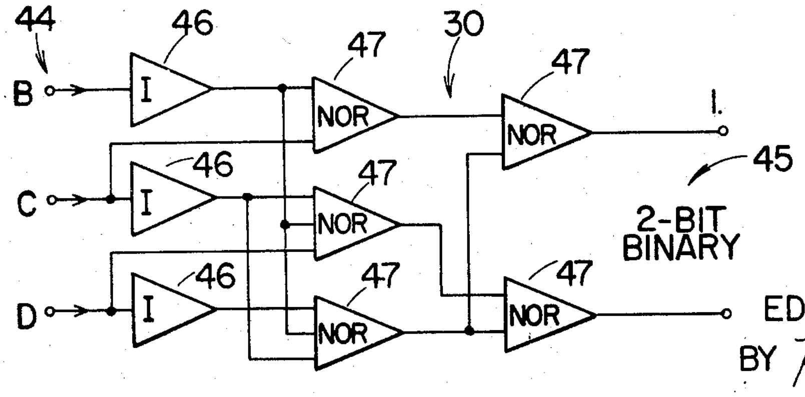
FIG. 3 is a schematic block diagram showing one form of decimal-to-binary converter usable in the system of FIG. 1.

Referring now to FIG. 3, one form of decimal-to-binary converter suitable for use as the converter 30 is shown. Here, in which the sequential dot analogue video signal pulses are quantized on only four levels, if one of those levels is zero, it is only necessary to apply the three higher levels 44B, C and D to the decimal-to-binary converter 30. The converter 30 shown in FIG. 3 comprises a conventional encoding matrix, shown as including three conventional inverters 46 and five conventional NOR circuits 47 which convert the four level amplitude-responsive signals to parallel, 2-bit, binary coded form on two output channels designated 45–1 and 45–2, as is well known to those skilled in the art.

It will be readily understood that other decimal-to-binary converting matrices may be employed, the specific encoding matrix 30 shown in FIG. 3 being merely illustrative.

Figure 4:
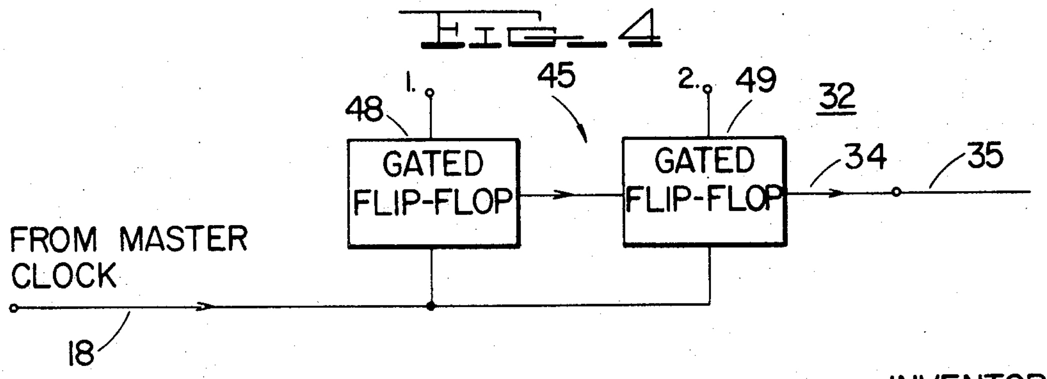
FIG. 4 is a schematic block diagram showing one form of parallel-to-serial converter usable in the system of FIG. 1.

Referring now to FIG. 4, the parallel-to-serial converter 32 may take the form of a conventional shift register which, in the illustrated embodiment utilizing a 2-bit binary code, employs two gated flip-flop circuits 48, 49, respectively coupled to the output circuits 45–1 and 45–2 of the decimal-to-binary converter 30 and utilizing the clock pulses from the master clock pulse generator 17 as shift pulses.

Figure 5:
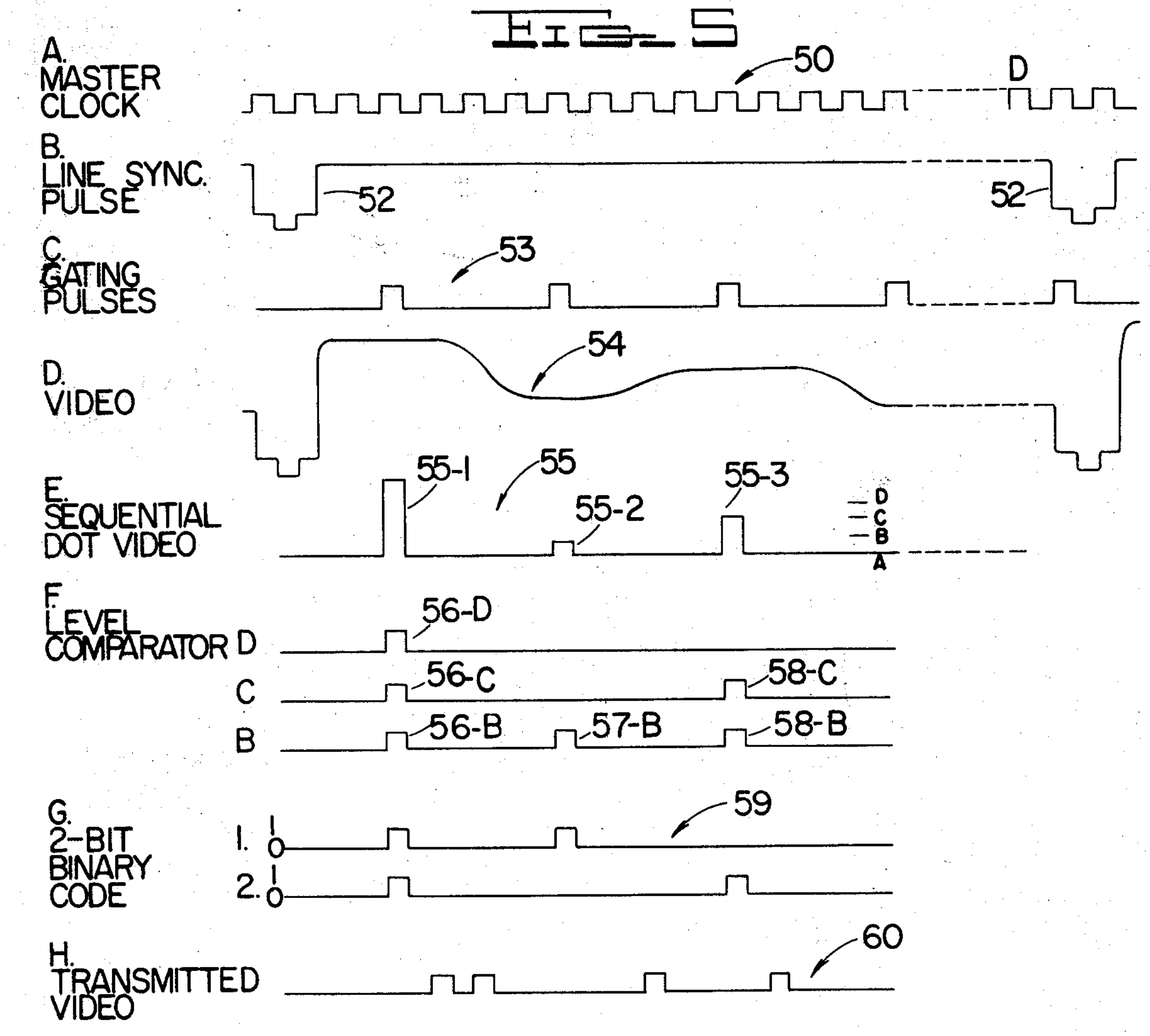
FIGS. 5A through H is a timing diagram useful in explaining the operation of the system of FIG. 1.

Referring now to FIG. 5, the train 50 of clock pulses having the frequency $f_c$ provided by the master clock pulse generator 17 are shown in FIG. 5A, and the line synchronizing pulses 52 provided by the line synchronizing pulse generator 13 are shown in FIG. 5B. Recalling now that the frequency $f_c$ of the clock pulses is divided by $n_2$ by the divider 24, $n_2$ being four in the illustrated embodiment, the divider 24 will provide a sampling or gate pulse in response to every fourth clock pulse, thereby providing the train 53 of sampling or gating pulses as shown in FIG. 5C.

The analogue video signal 54 which appears in the output circuit 12 of camera 11 and which is supplied to the sampling gate 26 is shown in FIG. 5D and recalling that the gate 26 is opened in response to the sampling pulses 53, it will be seen that a train 55 of sampled, analogue video signal pulses appears in the output circuit 27 of the gate 26.

Recalling now that in the illustrated embodiment, the train 55 of sampled, analogue video signal pulses is quantized on four amplitude levels by the amplitude level comparator 24, the four levels A, B, C and D are shown in FIG. 5E, level A being "zero" level. It will thus be seen that pulse 55–1 has an amplitude higher than levels A, B, C and D, pulse 55–2 has an amplitude higher than levels A and B but lower than levels C and D, and that pulse 55–3 has an amplitude level higher than levels A, B and C but lower than level D.

Referring to FIG. 5F, it will be seen that as a result of the amplitude level comparison provided by the comparator 29, application of the sampled, analogue video signal pulse 55–1 to the comparator 29 will result in the provision of "one" pulses 56–B, 56–C, and 56–D in the output channels 44–B, 44–C and 44–D of comparator 29. Likewise, application of the sampled, analogue video signal pulse 55–2 to comparator 29 will result in the provision of a "one" pulse 57–B in output circuit 44–B, and application of the sampled, analogue video signal pulse 55–3 to the comparator 29 will result in a provision of "one" pulses 58–B and 58–C in the output channels 44–B and 44–C. Application of the level-responsive pulses 56, 57 and 58 to the decimal-to-binary converter 30 results in the appearance of a corresponding parallel, 2-bit binary code 59 in the output channels 45–1 and 45–2 of converter 30, as shown in FIG. 5G, and application of this code to the parallel-to-serial converter 32 results in application of the serial 2-bit binary coded signal 60 to the output circuit 34 and transmission facility 35, the transmitted signal 60 consisting of "one" and "zero" signal bits.

Figure 6:
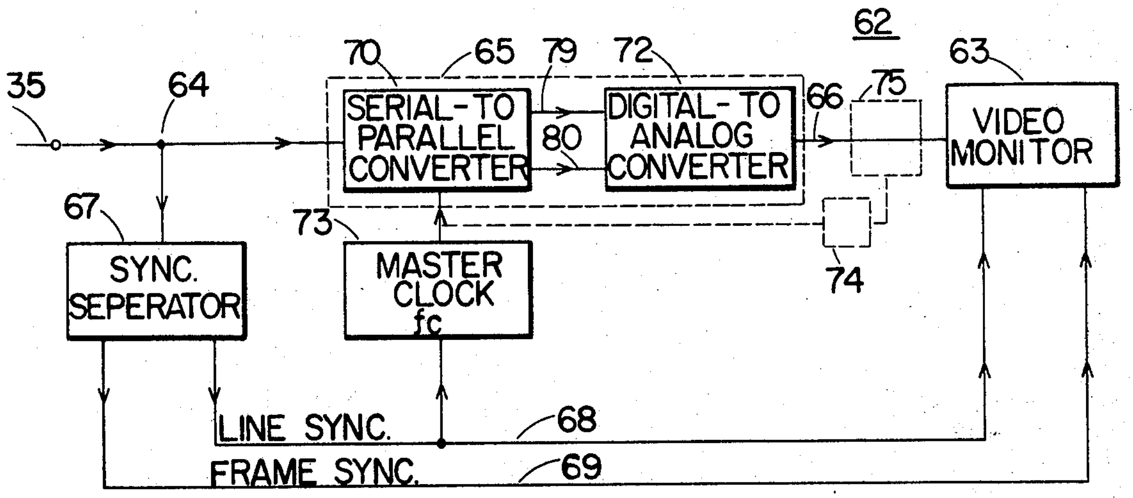
FIG. 6 is a schematic block diagram illustrating one embodiment of a receiving station for use with the transmitting station of FIG. 1.

Referring now to FIG. 6, at the receiving station generally indicated at 62, it is required that the serial, binary coded signal 60 transmitted by the transmission facility 35 be converted back to corresponding analogue form and applied to the video monitor 63. Thus, the receiving end of the transmission facility 35 is coupled to input circuit 64 which, in turn, is coupled to a digital-to-analogue converter, shown within the dashed lines 65, which has its output circuit 66 coupled to the video signal input circuit of the monitor 63.

A conventional synchronizing signal detector and separator circuit 67 is provided coupled to the input circuit 64 for detecting and separating the line and frame synchronizing pulses, and has its line and frame synchronizing pulse output circuits 68, 69 respectively coupled to the horizontal and vertical sweep circuits of the monitor 63.

The converter 65 comprises a conventional serial-to-parallel converter 70 and a conventional digital-to-analogue converter 72, the serial-to-parallel converter 70 being actuated by another master clock pulse generator 73 having a frequency $f_c$ and coupled to the line synchronizing pulse output circuit 68 of the separator 67 so as to insure synchronization with the master clock pulse generator 17 at the transmitting station. It may be desirable again to sample the analogue video signal pulses appearing in the output circuit 66 of the converter 65 and this may readily be accomplished by provision of another dividing circuit shown in dashed line 74, which divides the master clock pulses provided by the master clock pulse generator 73 by $n_2$, i.e., the dot interlace ratio, and another sampling gate, shown in dashed lines 75, coupled between a comparator 65 and the video monitor 63.

Figure 7:
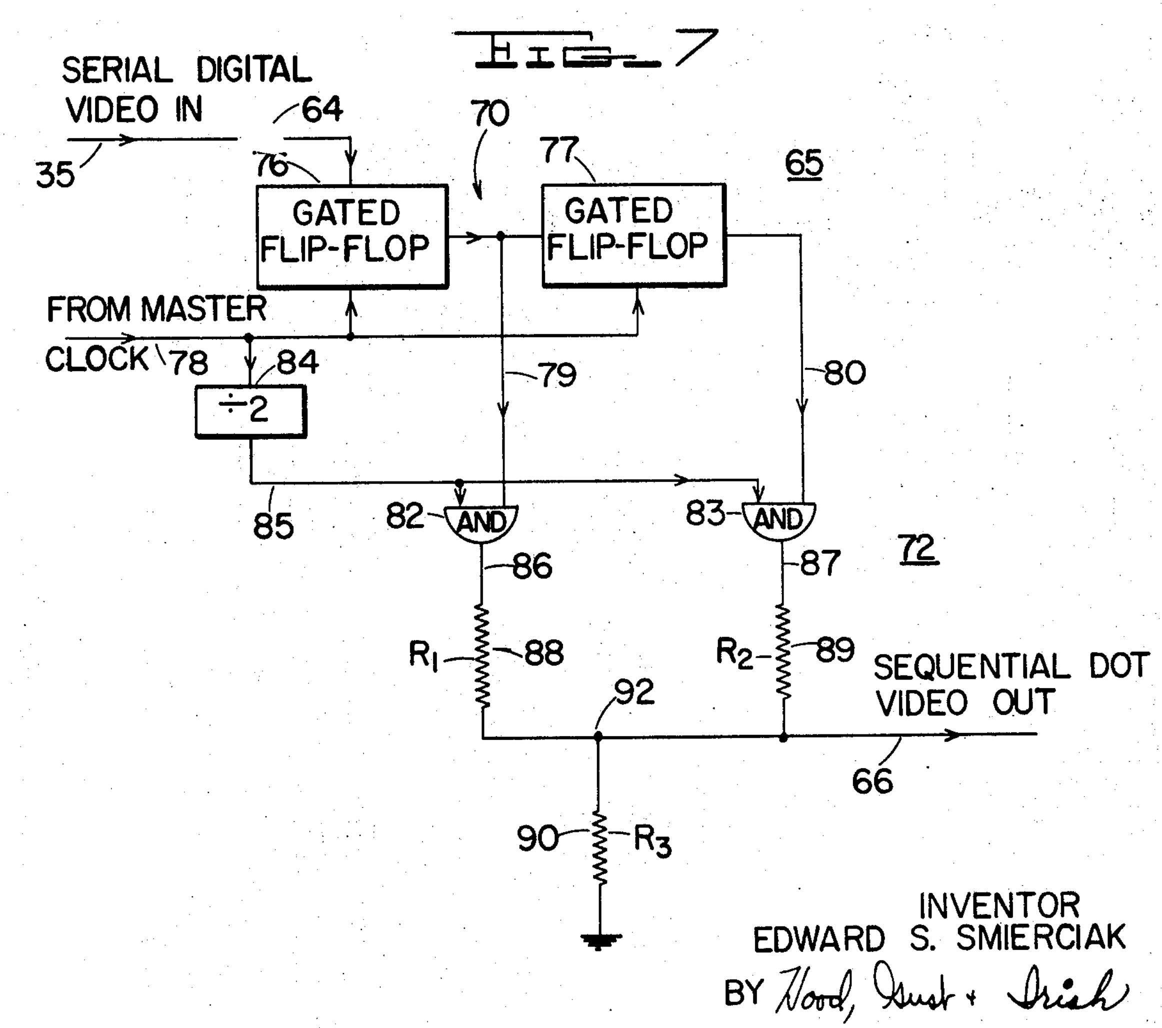
FIG. 7 is a schematic block diagram showing one form of serial-to-parallel converter and digital-to-analogue converter which may be used with the system as shown in FIG. 6.

Referring now to FIG. 7, one form of the digital-to-analogue converter 65 is shown. Here, the serial-to-parallel converter 70 takes the form of a conventional shift register comprising conventional gated flip-flop circuits 76, 77 receiving shift pulses from the output circuit 78 of the master clock pulse generator 73, the serial, binary coded video signal 60 thus being reconverted to parallel, 2-bit binary form and appearing in output circuits 79, 80. It will be readily understood that other conventional serial-to-parallel converters may be employed, the circuit shown in FIG. 7 being illustrative only.

The digital-to-analogue converter 72 may take the form of a conventional summing circuit. Here, output circuits 79 and 80 of the serial-to-parallel converter 70 are coupled to AND gates 82 and 83. A dividing circuit 84 divides the master clock pulse frequency by the number of bits in the code, i.e., two in the illustrated embodiment, and its output circuit 85 is likewise coupled to the AND gates 82, 83. Output circuits 86, 87 of the AND gates 82, 83 are respectively coupled to resistors 88, 89, having two different values $R_1$ and $R_2$, which in turn are coupled to a source of reference potential, such as ground, by a third resistor 90 having yet another value $R_3$. The connection 92 between resistors 88, 89 and 90 is coupled to the output circuit 66 with the reconstructed sampled, analogue video signal pulses appearing therein.

In application Ser. No. 636,060, now U.S. Pat. No. 3,499,980, filed Mar. 15, 1967 by the present inventor and assigned to the present assignee, there is described and illustrated a system and method of sequential dot interlacing which recognizes the fact that the only real requirement for dot interlacing is that the number of elements or dots in each line be the same number $D$. Each line has a usable or information-conveying signal portion which occurs between successive line synchronizing pulses, and in order to provide sequential dot interlacing, it is only necessary that this information-conveying signal portion be divided into $D$ elements or dots which, in turn, are sampled with the ratio $n_2$, i.e., every fourth, sixth, eighth, etc. dot. Thus, in accordance with the system and method of the aforesaid application Ser. No. 636,060, now U.S. Pat. No. 3,499,980, what is referred to as a "quasi" line is established which contains the exact predetermined number $D$ of interlace elements, this "quasi" line in all cases having a duration longer than the minimum and shorter than the maximum duration or interval of the usable portion of each line.

Figure 8:
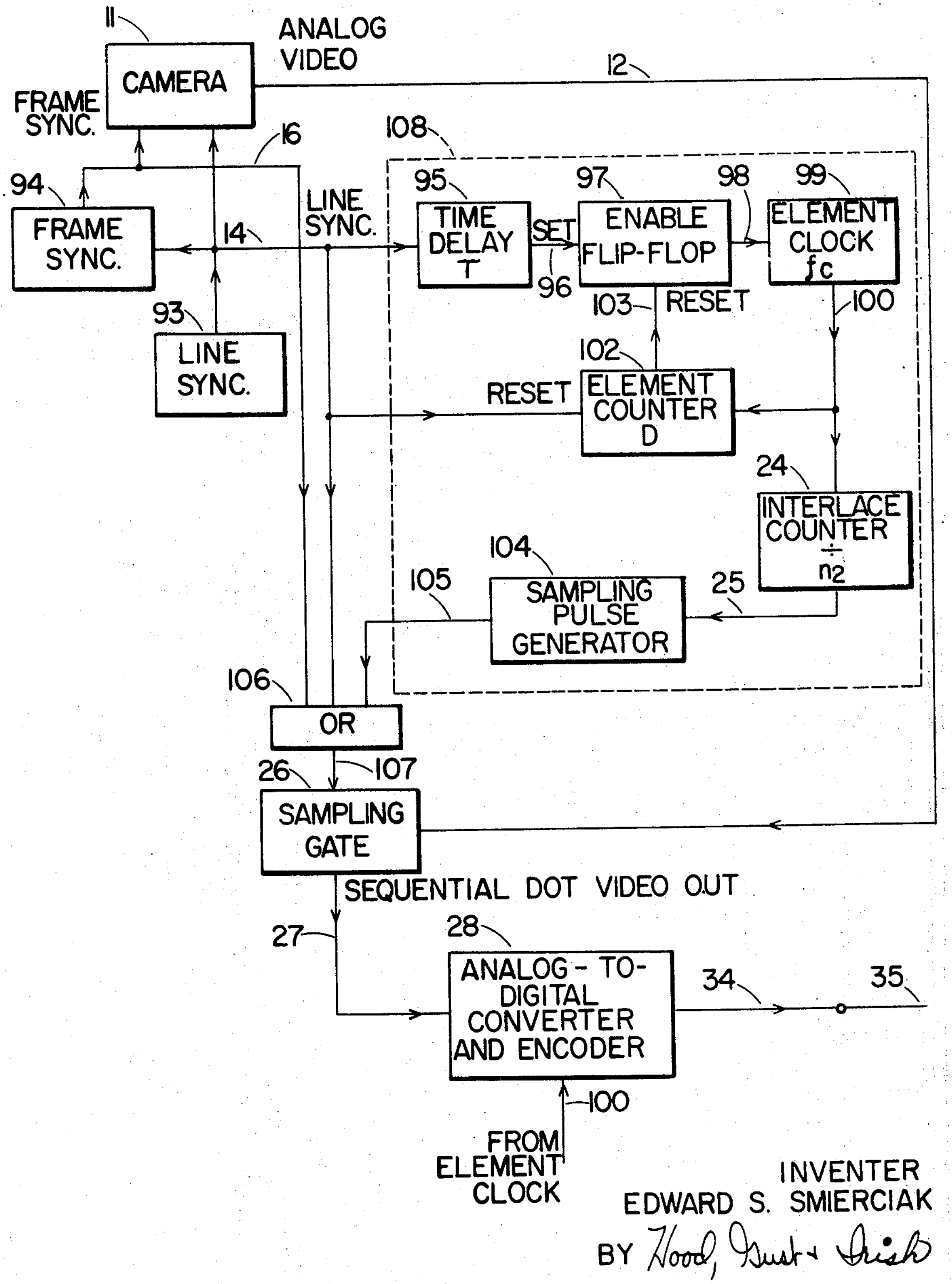
FIG. 8 is a schematic block diagram showing a transmitting station incorporating the preferred embodiment of the invention.

Referring now to FIG. 8 in which like elements are indicated by like reference numerals, in this embodiment, which employs the system and method further described and illustrated in said application Ser. No. 636,060, now U.S. Pat. No. 3,499,980, the interlace frequency $f_e$ is controlled independently of the line frequency $f_h$ and the frame frequency $f_v$, and thus, conventional line and frame synchronizing pulse generators 93 and 94 are provided respectively supplying line and frame synchronizing signals to the horizontal and vertical sweep circuits of the camera 11, the line and frame synchronizing pulse generators 93, 94 not being directly synchronized with the clock pulse generator 99 which establishes the elements in each line.

The line synchronizing pulse output circuit 14 is coupled to a conventional delay circuit 95, which may be a conventional monostable multivibrator, which generates a time delay pulse in response to each line synchronizing pulse, the delay pulse terminating after termination of the respective line synchronizing pulse. Output circuit 96 of the delay circuit 95 is coupled to the "set" circuit of a conventional enable flip-flop circuit 97 which generates an enabling signal in its output circuit 98. The enabling signal in output circuit 98 actuates a conventional clock pulse generator 99 which generates a train of clock pulses having the frequency $f_c$, the period of which corresponds to the elements or dots in each line. The frequency $f_c$ of the clock pulse generator 99 is set so that the requisite number $D$ of pulses is generated during the interval Q (FIG. 10A) between successive line synchronizing pulses 52.

The clock pulses generated by the clock pulse generator 99 appear in its output circuit 100, which is coupled to a conventional pulse counting circuit 102, which counts-down the clock pulses and provides a signal in its output circuit 103 when the desired number $D$ of clock pulses have been generated. Output circuit 103 of the element counter 102 is coupled to the "reset" circuit of the enable flip-flop 97 to thereby terminate the enabling signal and stop the clock pulse generator 99.

It will thus be seen that the delay circuit 95 and the enable flip-flop 97 insure that the clock pulse generator 99 is started at the same time on each line, i.e., after termination of the respective line synchronizing pulse 52, (although this is not a necessary condition,) the element counter 102 and enable flip-flop 97 further insuring that the clock pulse generator 99 is stopped when exactly the prescribed number $D$ of pulses have been generated. The element counter 102 is reset by the respective line synchronizing pulse 52 at the beginning of each line, line synchronizing pulse output circuit 14 being coupled to the "reset" circuit of the element counter 102. Output circuit 100 of the clock pulse generator 99 is also coupled to the interlace counter 24 which divides the clock pulse frequency $f_c$ by the sequential dot interlace ratio $n_2$. Output circuit 25 in the interlace counter 24 may be coupled to a conventional narrow sampling pulse generator 104 which, in turn, has its output circuit 105 coupled to a conventional OR circuit 106, to which the line and frame synchronizing pulse output circuits 14 and 16 are also connected. Output circuit 107 of the OR gate 106 is coupled to the sampling gate 26 along with output circuit 12 of the camera 11, output circuit 27 of the sampling gate 26 again being coupled to the analogue-to-digital converter 28 shown in FIG. 1.

Figure 9:
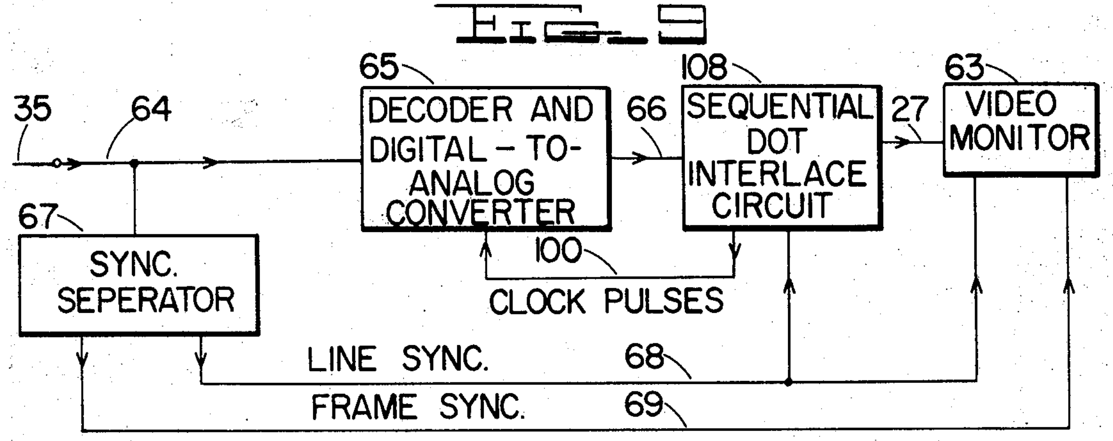
FIG. 9 is a schematic diagram showing a receiving station for use with the transmitting station of FIG. 8.

Referring now to FIG. 9, in which like elements are again indicated by like reference numerals, the synchronizing pulse separator and detector circuit 67 is again coupled to the input circuit 64 and has its line and frame synchronizing pulse output circuits 68 and 69 again coupled to the horizontal and vertical sweep circuits of the video monitor 63. Input circuit 64 is again coupled to the digital-to-analogue converter 65 shown in FIG. 6, which has its output circuit 66 coupled to another "quasi" line, sequential dot interlace circuit 108 which includes the same components as shown within the dashed line box 108 in FIG. 8, output circuit 27 in this case being coupled to the video signal input circuit of the monitor 63.

Figure 10:
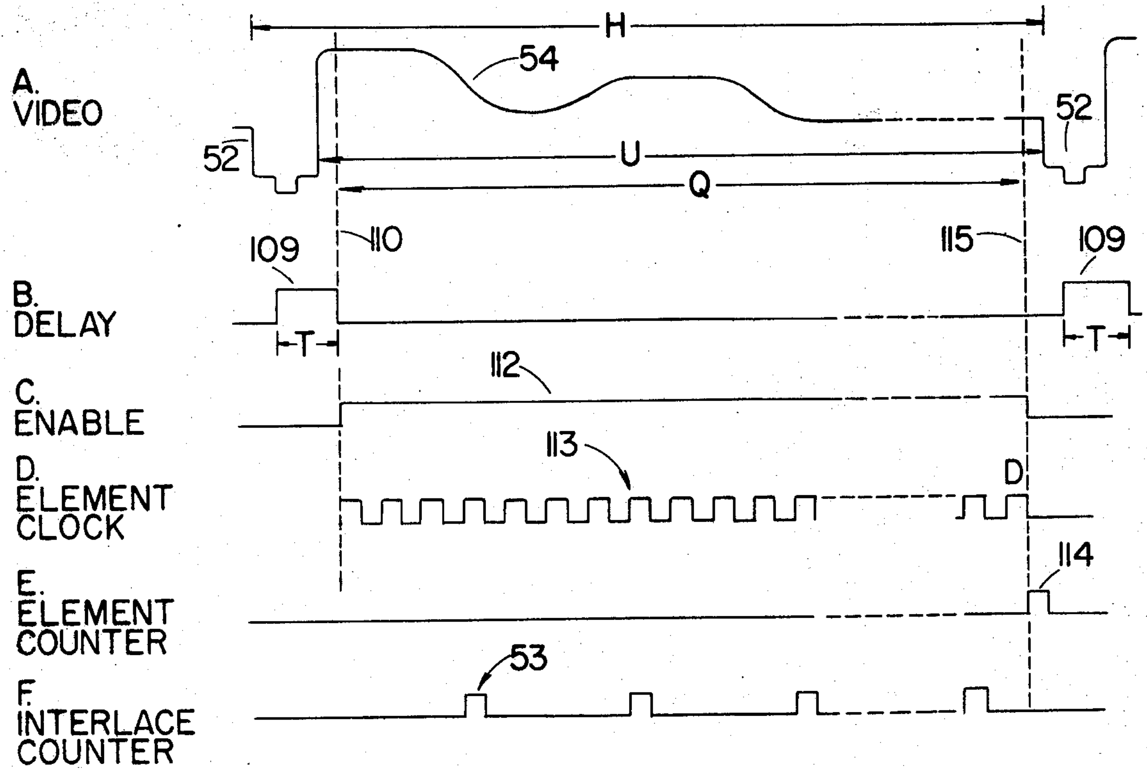
FIGS. 10A through F are timing diagrams useful in explaining the operation of the system of FIG. 8.

Referring now to FIG. 10A, there is shown a typical video signal 54 provided by the camera 11 including successive line synchronizing pulses 52. Here, the total duration of one line from one line synchronizing pulse 52 to the next indicated as H and the usable video signal portion between successive line synchronizing pulses as indicated as U.

Referring to FIG. 10B, the delay circuit 95 provides a time delay pulse 109 in response to each line synchronizing pulse 52, each delayed pulse 109 having a duration T and terminating following termination of the respective line synchronizing pulse 52, as shown at 110.

Referring to FIG. 10C, termination of the delay pulse 109 actuates the enable flip-flop circuit 97 to generate the enabling signal 112 which actuates the clock pulse generator 99 to initiate the train 113 of clock pulses, as shown in FIG. 10B. The element counter 102 counts down the train of clock pulses 113 and when the requisite number D has been reached, reset pulse 114 is generated, as shown in FIG. 10E, which is applied to the enable flip-flop circuit 97 to terminate the enabling signal 112, as at 115, thus stopping the clock pulse generator 99 and establishing the "quasi" line Q as shown in FIG. 10A. It will thus be seen that the "quasi" line Q which contains exactly $D$ clock pulses 113 is in each case generated within the usable signal portion U of each line.

The interlace counter 24 again divides the clock pulses 113 by the sequential dot interlace ratio $n_2$, shown as being four in the illustrated embodiment, thereby providing the train of sampling pulses 53, as shown in FIG. 10F. The train of sampling pulses 53 again is applied to the sampling gate 26 thereby to provide the train 55 of sampled, analogue video signal pulses (FIG. 5E) which is applied to the analogue-to-digital converter 28 for conversion to serial, binary signal form.

While there have been described above the principles of this invention in connection with specific apparatus, it is to be clearly understood that this description is made only by way of example and not as a limitation to the scope of the invention.

I claim:

1. A sequential dot, digitally encoded, raster-type television transmission system comprising: input circuit means for receiving a time-based video signal having recurrent line and frame synchronizing signals; sequential dot video output circuit means; means for generating a train of recurrent sampling signals having a frequency $$f_e = f_v\left(\frac{LD}{n_1 n_2}\right)$$

where $f_v$ is the frequency of said frame synchronizing signals, $L$ is the number of lines in one frame, $D$ is a predetermined number of picture elements in one line, $n_1$ is the vertical interlace ratio and $n_2$ is a predetermined dot interlace ratio, the quotient $LD/n_1n_2$ being irreducible; means for generating a train of recurrent timing signals having a frequency $f_c = f_e n_2$; means for actuating said timing signal generating means in response to each said line synchronizing signal thereby to initiate a said train of timing signals; and means for terminating each said train of timing signals in response to $D$ timing signals; $f_c$ being such that each interval between successive line synchronizing signals is longer than $D$ timing signals; said sampling signal generating means being responsive to said timing signals; means for coupling said input circuit means to said output circuit means in response to said train of sampling signals thereby to pass analogue video signals from said input circuit means to said output circuit means; means for detecting the amplitudes of said sampled video signals and for providing signals respectively responsive to a plurality of predetermined amplitude levels thereof; and means for digitally encoding said last-named signals.

2. The system of claim 1 wherein said encoding means includes means for converting said last-named signals to parallel binary coded signal form, and means for converting said parallel binary coded signals to serial binary coded form.

3. The system of claim 1 wherein said detecting means includes means for comparing the amplitudes of said sampled video signals in a plurality of reference signals respectively having said predetermined levels.

4. The system of claim 2 wherein said last-named converting means includes shift register means responsive to said timing signal generating means.

5. The system of claim 1 further comprising transmission means coupled to said encoding means; video signal monitor means; and digital-to-analogue signal converting means coupling said transmission means to said monitor means.

6. The system of claim 2 further comprising transmission means coupled to said parallel-to-series converting means; video signal monitor means; means coupled to said transmission means for converting said serial binary coded signals to parallel binary coded form; and means coupling said last-named converting means to said monitor means for converting said parallel binary coded signals to analogue form.

7. The system of claim 5 further comprising means for generating a second train of sampling signals having a frequency $f_e$; means for synchronizing said first and second-named generating means; and means for coupling said digital-to-analogue converting means to said monitor means in response to said second train of sampling signals.

8. The system of claim 1 wherein said coupling means includes means for coupling said line and frame synchronizing signals to said output circuit means; and further comprising means for transmitting said digitally encoded signals and said line and frame synchronizing signals; video signal monitor means having video signal input circuit means and line and frame sweep means; means coupling said transmitting means to said line and frame sweep means for separating said line and frame sweep signals; digital-to-analogue signal converting means coupled to said transmitting means for converting said encoded digital signals to corresponding analogue signals; second means for generating a second train of recurrent timing signals having a frequency $f_c$, means coupling said separating means to said second generating means for actuating the same in response to each separated line synchronizing signal thereby to initiate said second train of timing signals; means for terminating each said second train of timing signals in response to $D$ second timing signals; second means for generating a second train of sampling signals having a frequency $f_e$, said second sampling signal generating means being coupled to said second timing signal generating means and actuated thereby; and means coupling said digital-to-analogue signal converting means to said input circuit means of said monitor means in response to said second train of sampling signals.